US012759392B2

(12) United States Patent
Dilts et al.

(10) Patent No.: US 12,759,392 B2
(45) Date of Patent: Oct. 13, 2026

(54) AXLE ASSEMBLY FOR AN ELECTRIC WORK VEHICLE

(71) Applicant: CNH Industrial America LLC, New Holland, PA (US)

(72) Inventors: Mark D. Dilts, Mohnton, PA (US); Andrew Victor Lauwers, Sandusky, OH (US)

(73) Assignee: CNH Industrial America LLC, New Holland, PA (US)

( * ) Notice: Subject to any disclaimer, the term of this patent is extended or adjusted under 35 U.S.C. 154(b) by 403 days.

(21) Appl. No.: 18/476,791

(22) Filed: Sep. 28, 2023

(65) Prior Publication Data

US 2025/0108686 A1 Apr. 3, 2025

(51) Int. Cl.

| | |
|---|---|
| ***B60K 17/04*** | (2006.01) |
| ***B60B 35/14*** | (2006.01) |
| ***B60K 1/00*** | (2006.01) |
| ***B60K 17/08*** | (2006.01) |
| ***B60L 15/00*** | (2006.01) |
| ***B62D 49/06*** | (2006.01) |
| ***F16H 57/02*** | (2012.01) |

(52) U.S. Cl.

CPC .............. *B60K 17/046* (2013.01); *B60K 1/00* (2013.01); *B60K 17/08* (2013.01); *B60L 15/007* (2013.01); *F16H 57/02* (2013.01); *B60B 35/14* (2013.01); *B60K 2001/001* (2013.01); *B62D 49/06* (2013.01); *F16H 2057/02034* (2013.01); *F16H 2057/02052* (2013.01); *F16H 2057/02056* (2013.01); *F16H 2200/0021* (2013.01); *F16H 2200/0034* (2013.01)

(58) Field of Classification Search

CPC ........ B60K 17/046; B60K 1/00; B60K 17/08; B60K 2001/001; F16H 2057/02052; F16H 2057/02056; B60L 15/007

USPC ........................................................... 180/62

See application file for complete search history.

(56) References Cited

U.S. PATENT DOCUMENTS

| | | | |
|---|---|---|---|
| 4,662,472 | A | 5/1987 | Christianson et al. |
| 6,095,005 | A | 8/2000 | Tanzer et al. |
| 7,314,105 | B2 | 1/2008 | Varela |
| 9,334,940 | B2 | 5/2016 | Neumann |

(Continued)

FOREIGN PATENT DOCUMENTS

DE 102018222004 A1 6/2020

OTHER PUBLICATIONS

Sigma Powertrain. EMAXle, 1 page. Retrieved from https://sigmapowertrain.com/wp-content/uploads/2022/05/EMAXle-Series-Technical-Specifications-2022-V1.pdf.

*Primary Examiner* — Hau V Phan

(74) *Attorney, Agent, or Firm* — Dority & Manning, P.A.

(57) ABSTRACT

An axle assembly for an electric work vehicle includes an electric drive system including an electric motor and a first axle hub. Furthermore, the axle assembly includes a first axle shaft having a first end and a second end, with the first end of the first axle shaft coupled to the electric motor. Additionally, the axle assembly includes a first gear train coupled between the second end of the first axle shaft and the first axle hub. Moreover, the axle assembly includes a second axle hub and a second axle shaft including a first end and a second end, with the first end of the second axle shaft coupled to the electric motor. In addition, the axle assembly includes a second gear train coupled between the second end of the second axle shaft and the second axle hub.

18 Claims, 7 Drawing Sheets

(56) References Cited

U.S. PATENT DOCUMENTS

| | | | | |
|---|---|---|---|---|
| 9,764,644 | B2 * | 9/2017 | Nishida | B60L 3/00 |
| 10,107,363 | B2 | 10/2018 | Fliearman et al. | |
| 10,807,466 | B1 * | 10/2020 | Haka | F16H 37/082 |
| 10,988,193 | B2 | 4/2021 | Watt et al. | |
| 11,105,380 | B2 | 8/2021 | Kathman, Jr. et al. | |
| 11,220,150 | B2 * | 1/2022 | Laforce | B60G 9/027 |
| 11,472,282 | B2 | 10/2022 | Oldeide et al. | |
| 11,674,566 | B2 * | 6/2023 | Brammer | F16H 37/0806<br>475/204 |
| 2017/0315700 | A1 * | 11/2017 | Rolih | G06F 3/04817 |
| 2021/0114450 | A1 * | 4/2021 | Kucharski | B60K 6/48 |
| 2021/0237566 | A1 * | 8/2021 | Chopra | B60K 17/046 |
| 2021/0245599 | A1 | 8/2021 | Mepham et al. | |
| 2021/0252977 | A1 * | 8/2021 | Engerman | B60K 1/00 |
| 2021/0387475 | A1 | 12/2021 | Keeney et al. | |
| 2022/0194489 | A1 * | 6/2022 | Roche | A61G 3/061 |

* cited by examiner

AXLE ASSEMBLY FOR AN ELECTRIC WORK VEHICLE

FIELD OF THE INVENTION

The present disclosure generally relates to electric work vehicles and, more particularly, to axle assemblies for an electric work vehicle.

BACKGROUND OF THE INVENTION

An electric work vehicle, such as an electric agricultural vehicle or an electric construction vehicle, typically includes one or more electric motors for propelling the vehicle. In this respect, the electric motor(s) is coupled to at least some of the wheels of the electric work vehicle, thereby permitting the motor(s) to drive such wheels. For example, in one configuration, each driven wheel of the electric work vehicle is driven by a dedicated electric motor positioned at and coupled directly to that wheel. Such a configuration requires at least two separate electric motors (and sometimes four motors), thereby increasing the cost, complexity, and weight of the electric vehicle.

Conversely, in other configurations, a single electric motor may drive a pair of driven wheels of the electric work vehicle. The use of a single electric motor generally reduces the cost, complexity, and weight of the electric vehicle. In such configurations, the electric motor may be coupled to the pair of driven wheels via an axle assembly. While many current axle assemblies for electric work vehicles work well, further improvements are needed.

Accordingly, an improved axle assembly for an electric vehicle would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an axle assembly for an electric work vehicle. The axle assembly includes an electric drive system having an electric motor configured to generate rotational energy and a first axle hub configured to be rotationally driven by the electric motor. Furthermore, the axle assembly includes a first axle shaft having a first end and a second end, with the first end of the first axle shaft coupled to the electric motor such that the first axle shaft transmits a first portion of the rotational energy generated by the electric motor to the first axle hub. Additionally, the axle assembly includes a first gear train coupled between the second end of the first axle shaft and the first axle hub, with the first gear train configured to increase a torque of the first portion of the rotational energy transmitted by the first axle shaft to the first axle hub. Moreover, the axle assembly includes a second axle hub configured to be rotationally driven by the electric motor and a second axle shaft including a first end and a second end, with the first end of the second axle shaft coupled to the electric motor such that the second axle shaft transmits a second portion of the rotational energy generated by the electric motor to second axle hub. In addition, the axle assembly includes a second gear train coupled between the second end of the second axle shaft and the second axle hub, with the second gear train configured to increase a torque of the second portion of the rotational energy transmitted by the second axle shaft to the second axle hub.

In another aspect, the present subject matter is directed to an electric work vehicle including a frame and an axle assembly coupled to the frame. The axle assembly includes an electric drive system having an electric motor configured to generate rotational energy and a first axle hub configured to be rotationally driven by the electric motor. Furthermore, the axle assembly includes a first axle shaft having a first end and a second end, with the first end of the first axle shaft coupled to the electric motor such that the first axle shaft transmits a first portion of the rotational energy generated by the electric motor to the first axle hub. Additionally, the axle assembly includes a first gear train coupled between the second end of the first axle shaft and the first axle hub, with the first gear train configured to increase a torque of the first portion of the rotational energy transmitted by the first axle shaft to the first axle hub. Moreover, the axle assembly includes a second axle hub configured to be rotationally driven by the electric motor and a second axle shaft including a first end and a second end, with the first end of the second axle shaft coupled to the electric motor such that the second axle shaft transmits a second portion of the rotational energy generated by the electric motor to second axle hub. In addition, the axle assembly includes a second gear train coupled between the second end of the second axle shaft and the second axle hub, with the second gear train configured to increase a torque of the second portion of the rotational energy transmitted by the second axle shaft to the second axle hub.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
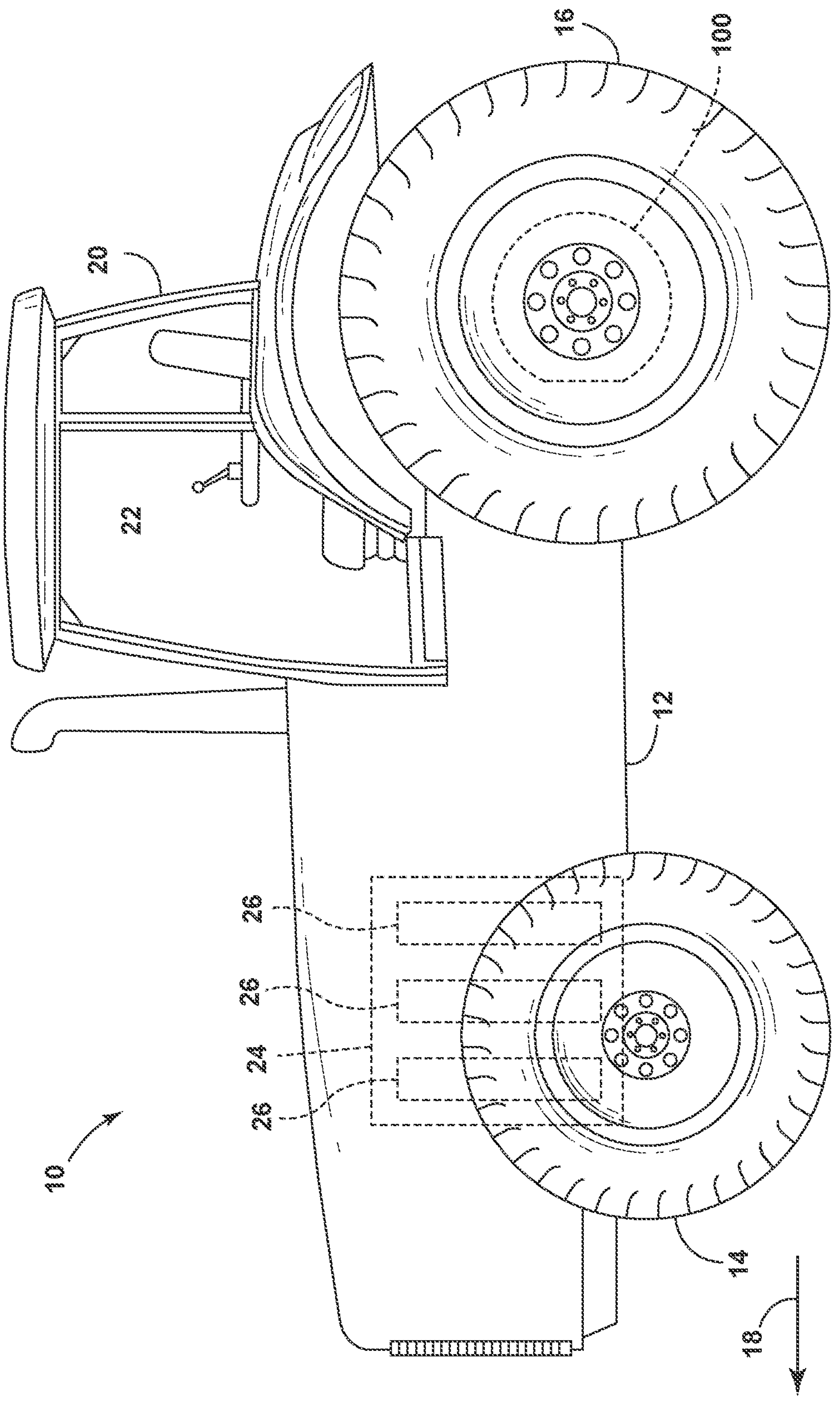
FIG. 1 illustrates a side view of one embodiment of an electric work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to an axle assembly for an electric work vehicle, such as an electric agricultural vehicle or an electric construction vehicle. Specifically, in several embodiments, the axle assembly includes an electric drive system having an electric motor configured to generate rotational energy. Such rotational energy is, in turn, used to rotationally drive a pair of powered wheels on the electric work vehicle. Furthermore, in some embodiments, the electric drive system may include a gearbox coupled to the electric motor and/or an inverter configured to convert DC power from the battery (ies) of the electric work vehicle into AC power for use by the electric motor. For example, in one embodiment, the electric motor, gearbox, and inverter are configured as a single integrated unit, which is known as an "e-axle."

Additionally, the axle assembly includes a first axle hub, a first axle shaft, and a first gear train. More specifically, the first axle hub is configured to be rotationally driven by the electric motor. Thus, one of the driven wheels of the electric work vehicle may be mounted on the first axle hub. Moreover, a first end of the first axle shaft is coupled to the electric motor. As such, the first axle shaft transmits a first portion of the rotational energy generated by the electric motor to the first axle hub. In addition, the first gear train is coupled between a second end of the first axle shaft and the first axle hub. In this respect, the first gear train is configured to increase the torque of the first portion of the rotational energy transmitted by the first axle shaft to the first axle hub. Thus, the first axle shaft is positioned between the electric motor and the first gear train such that the first gear train is positioned outboard of the first axle shaft. That is, the first gear train is closer to the first axle hub than to the electric motor.

Furthermore, the axle assembly includes a second axle hub, a second axle shaft, and a second gear train. More specifically, the second axle hub is configured to be rotationally driven by the electric motor. Thus, another of the driven wheels of the electric work vehicle may be mounted on the second axle hub. Additionally, a first end of the second axle shaft is coupled to the electric motor. As such, the second axle shaft transmits a second portion of the rotational energy generated by the electric motor to the second axle hub. Moreover, the second gear train is coupled between a second end of the second axle shaft and the second axle hub. In this respect, the second gear train is configured to increase the torque of the second portion of the rotational energy transmitted by the second axle shaft to the second axle hub. Thus, the second axle shaft is positioned between the electric motor and the second gear train such that the second gear train is positioned outboard of the second axle shaft. That is, the second gear train is closer to the second axle hub than to the electric motor.

Additionally, in some embodiments, the frame of the electric vehicle may be supported on the first and second axle hubs. Specifically, in such embodiments, the weight of the frame and the components supported thereon is transmitted from the frame through the first and second axle hubs and the wheels of the electric work vehicle to the ground. Thus, in such embodiments, the frame is unsupported on the first and second axle shafts.

The disclosed axle assembly improves the operation of the electric work vehicle in which it is installed. More specifically, as described above, the first and second gear trains are positioned outboard of the first and second axles shafts such that the first and second gear trains are closer to the first and second axles hubs than to the electric motor, respectively. Thus, the first and second axles shafts transmit the rotational energy generated by the electric motor to the first and second gear trains, which increase the torque of the rotational energy to a level suitable for driving the wheels of the electric work vehicle. In this respect, the disclosed axle assembly allows the rotational energy generated by the electric motor to be transmitted at a lower torque level than if the first and second gear trains were inboard of the first and second axles, respectively. This reduces the load placed on the first and second axles shafts. Additionally, supporting the frame of the vehicle on the first and second axle hubs further reduces the load placed on the first and second axles shafts. As such, by reducing the loads on the first and second axles shafts, the disclosed axle assembly allows from the use of the smaller and lighter axle shafts, which, in turn, reduces the weight and cost of the electric work vehicle.

Referring now to the drawings, FIG. 1 illustrates a side view of one embodiment of an electric work vehicle 10 in accordance with aspects of the present subject matter. As shown, the electric work vehicle 10 is configured as an electric agricultural vehicle, such as the illustrated tractor. However, in other embodiments, the electric work vehicle 10 may be configured as an electric construction vehicle or any other suitable electric work vehicle.

As shown in FIG. 1, the electric work vehicle 10 includes a frame or chassis 12 configured to support or couple to a plurality of components. For example, a pair of steerable front wheels 14 (one of which is shown)) and a pair of driven rear wheels 16 (one of which is shown)) may be coupled to the frame 12. The wheels 14, 16 may be configured to support the electric work vehicle 10 relative to the ground surface and move the electric work vehicle 10 along the ground surface in a direction of travel (indicated by arrow 18). However, in alternative embodiments, the front wheels 14 may be driven in addition to or in lieu of the rear wheels 16. Additionally, an operator's cab 20 may be supported by a portion of the chassis 12 and may house one or more operator control devices 22 (e.g., a joystick(s), a lever(s), and/or the like) for permitting an operator to control the operation of the electric work vehicle 10.

Furthermore, the electric work vehicle 10 may include one or more energy storage devices for storing electric energy for use in operating the vehicle 10. For example, in the illustrated embodiment, the electric work vehicle 10 includes a battery module 24 having three batteries 26 supported on the chassis 12. In such an embodiment, the batteries 82 may be configured to provide electric power for use in propelling the electric work vehicle 10 in the direction of travel 18 and for various power-consuming components of the vehicle 10. However, in alternative embodiments, electric work vehicle 10 may include any other suitable energy storage device, such as a battery module with any other suitable number of batteries.

Additionally, the electric work vehicle 10 includes an axle assembly 100. In general, and as will be described below, the axle assembly 100 is configured to convert the electric energy stored within the energy storage device(s) into rotational movement of two or more wheels of the electric work vehicle 10. In the illustrated embodiment, the electric work vehicle 10 includes one axle assembly 100 configured to drive the rear wheels 16 of the vehicle 10. However, in alternative embodiments, the electric work vehicle 10 may one axle assembly 100 configured to rotationally drive the front wheels 14 of the vehicle 10 or two axle assemblies 100 configured to rotationally drive the front and rear wheels 14, 16.

It should be further appreciated that the configuration of the electric work vehicle 10 described above and shown in FIG. 1 is provided only to place the present subject matter in an exemplary field of use. Thus, it should be appreciated that the present subject matter may be readily adaptable to any manner of electric work vehicle configuration.

Figure 2:
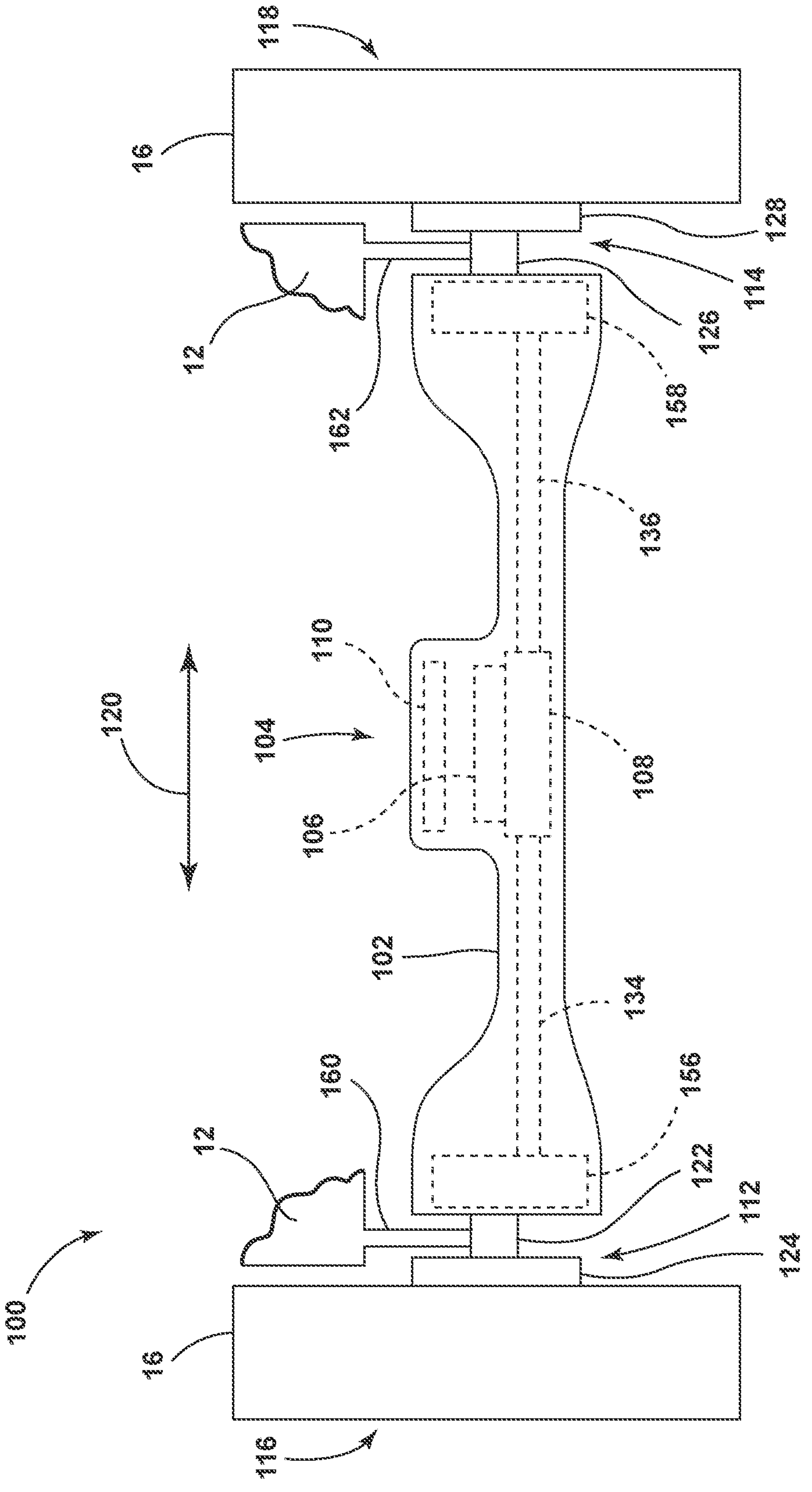
FIG. 2 illustrates a front view of one embodiment of an axle assembly for an electric work vehicle in accordance with aspects of the present subject matter.
Figure 3:
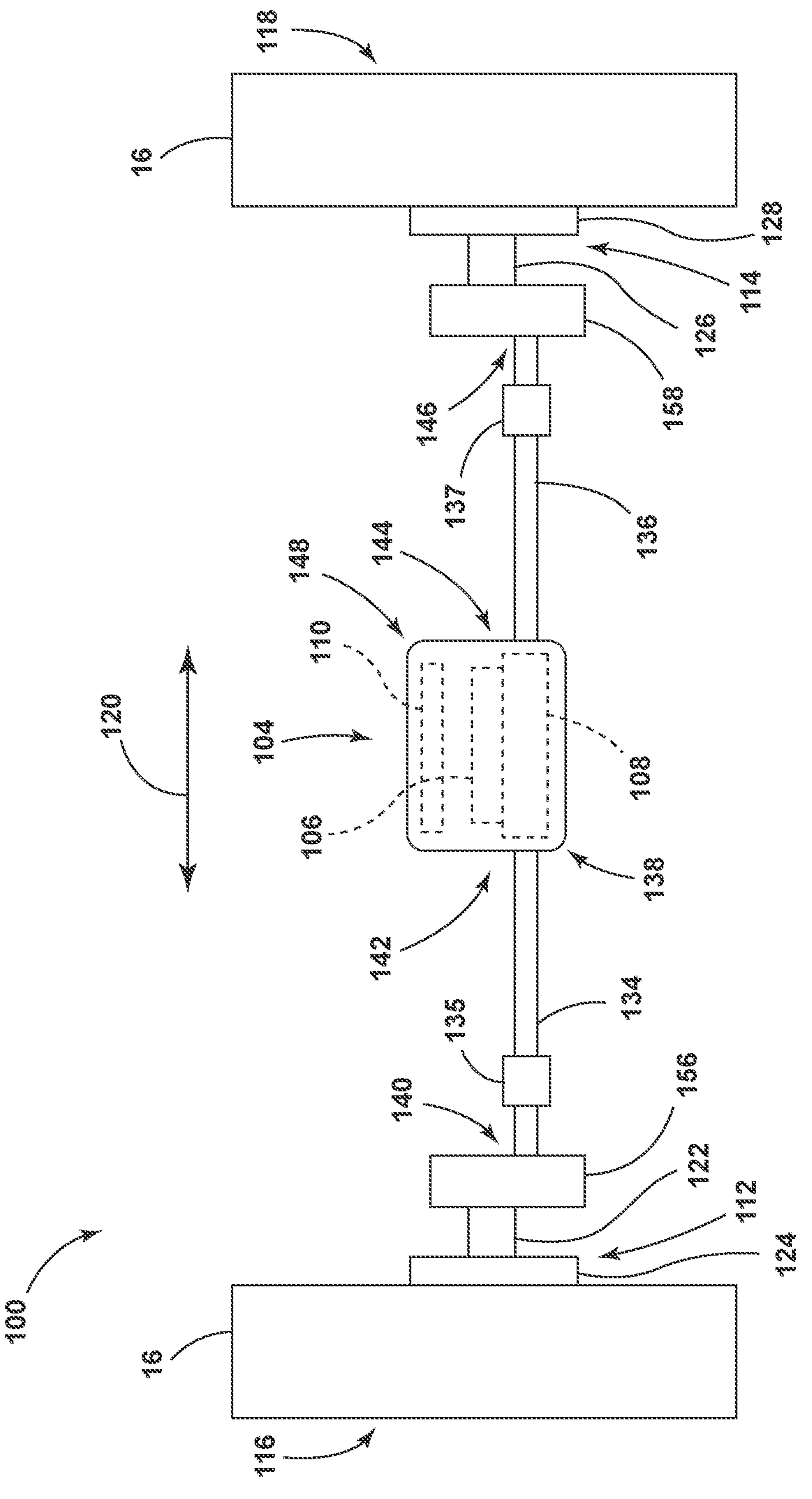
FIG. 3 illustrates another front view of the axle assembly shown in FIG. 2 with a housing of the axle assembly removed.
Figure 4:
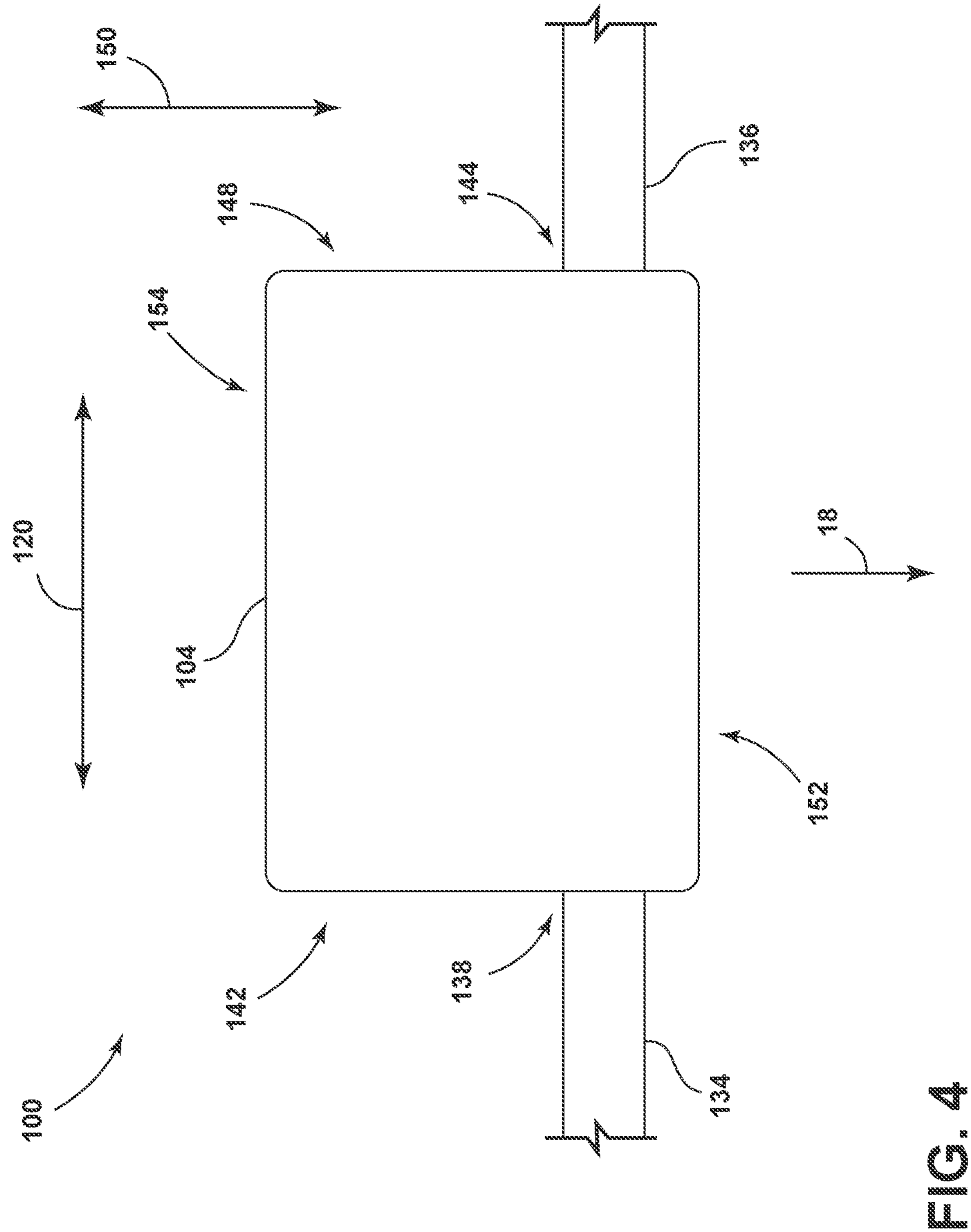
FIG. 4 illustrates a partial top view of the axle assembly shown in FIGS. 2 and 3 with the housing removed.

FIG. 2-4 illustrate differing views of one embodiment of an axle assembly 100 for an electric work vehicle in accordance with aspects of the present subject matter. More specifically, FIG. 2 illustrates a front view of the axle assembly 100. Furthermore, FIG. 3 illustrates another front view of the axle assembly 100, with a housing 102 of the axle assembly 100 removed for clarity purposes. Additionally, FIG. 4 illustrates a partial top view of the axle assembly 100. In general, the axle assembly 100 will be described herein with reference to the electric work vehicle 10 described above with reference to FIG. 1. However, it should be appreciated by those of ordinary skill in the art that the disclosed axle assembly 100 may generally be utilized with electric work vehicles having any other suitable vehicle configuration.

As shown, the axle assembly 100 includes an electric drive system 104. In general, the electric drive system 104 is configured to rotationally drive the driven wheels 16 of the electric work vehicle 10. As such, in several embodiments, the electric drive system 104 includes an electric motor 106 configured to generate rotational energy, such as from electrical energy received from the battery module 24 (FIG. 1). In this respect, and as will be described below, the axle assembly 100 includes various components that transmit the rotational energy generated by the electric motor 106 to the driven wheels 16.

Moreover, the electric drive system 104 may include other components supporting the operation of the electric motor(s) 106. For example, in several embodiments, the electric drive system 104 may include a gearbox 108 coupled to the electric motor 106. Additionally, in such embodiments, the electric drive system 104 may include an inverter 110 configured to convert DC electric power received from the battery module 24 (FIG. 1) of the electric work vehicle 10 into AC power for use by the electric motor 106. Furthermore, in one embodiment, the electric motor 106, the gearbox 108, and the inverter 110 may be packaged or otherwise configured as a single integrated unit, which is known as an "e-axle." However, in alternative embodiments, the electric drive system 104 may include other suitable components.

Additionally, as shown in FIGS. 2 and 3, in some embodiments, the electric drive system 104 is generally positioned at or substantially at the center of the axle assembly 100. However, in alternative embodiments, the electric drive system 104 may be positioned off center of the axle assembly 100.

Furthermore, the axle assembly 100 includes first and second axle hubs 112, 114 configured to be rotationally driven by the electric motor 106. Specifically, in several embodiments, the first axle hub 112 is positioned at a first end 116 of the axle assembly 100, while the second axle hub 114 is positioned at an opposed, second end 118 of the axle assembly 100. As such, the first and second axle hubs 112, 114 are spaced apart from each other along a longitudinal direction (indicated by arrows 120) extending from the first axle hub 112 to the second axle hub 114. The longitudinal direction 120, in turn, extends generally perpendicular to the direction of travel 18 of the electric work vehicle 10. Moreover, the electric drive system 104 is positioned between the first and second axle hubs 112, 114 along the longitudinal direction 120. As will be described below, the first and second axle hubs 112, 114 are coupled to the driven wheels 16 of the electric work vehicle 10. For example, the driven wheels 16 may be mounted on the first and second axle hubs 112, 114.

Figure 5:
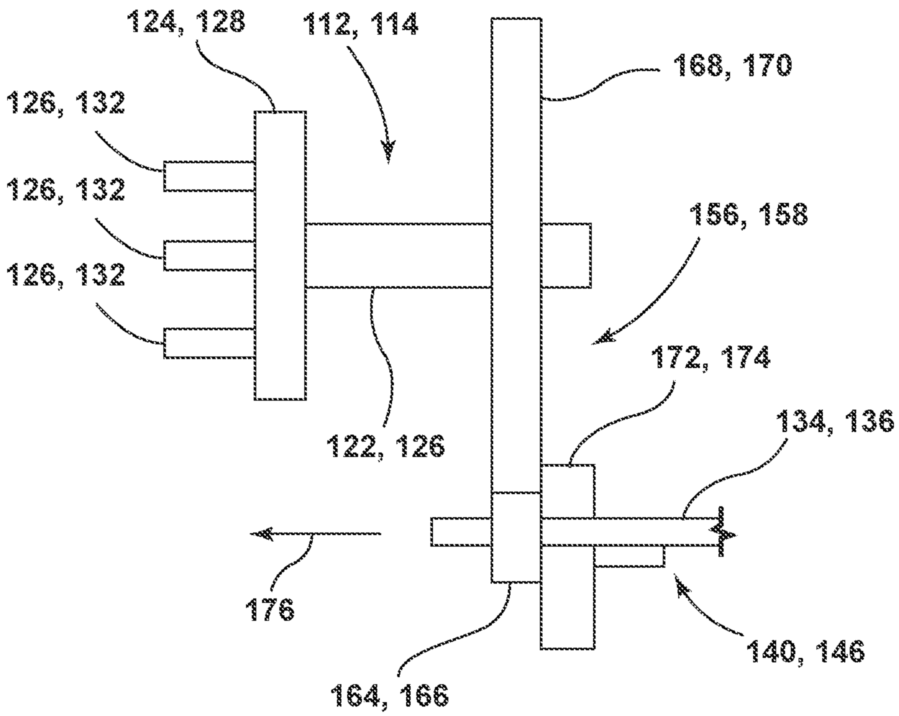
FIG. 5 illustrates a front view of one embodiment of first and second gear trains of an axle assembly for an electric work vehicle in accordance with aspects of the present subject matter, particularly illustrating intermediate gears of the first and second gear trains at a first position.

The first and second axle hubs 112, 114 may be configured in any suitable manner. For example, as shown in FIGS. 2 and 3, in the illustrated embodiment, the first axle hub 112 includes a first axle hub spindle 122 and a first axle hub rotor 124 coupled to the first axle hub spindle 122. The first axle hub rotor 124 may, in turn, be coupled to one of the driven wheels 16, such as via wheel studs 126 (FIG. 5). Similarly, in the illustrated embodiment, the second axle hub 114 includes a second axle hub spindle 128 and a second axle hub rotor 130 coupled to the second axle hub spindle 128. The second axle hub rotor 130 may, in turn, be coupled to another of the driven wheels 16, such as via wheel studs 132 (FIG. 5). However, in alternative embodiments, the first and second axle hubs 112, 114 may have any other suitable configuration.

Additionally, the axle assembly 100 includes first and second axle shafts 134, 136. In general, the first axle shaft 134 is positioned between the electric drive system 104 and the first axle hub 112 along the longitudinal direction 120. Specifically, the first axle shaft 134 extends along the longitudinal direction 120 from a first end 138 of the first axle shaft 134 to a second end 140 of the first axle shaft 134. The first end 138 of the first axle shaft 134 is, in turn, coupled to a first side 142 of the electric drive system 104 and, more specifically, to the electric motor 106 on the first side 142 of the electric drive system 104 via the gearbox 108. Conversely, the second end 140 of the first axle shaft 134 is coupled to the first axle hub 112. As such, the first axle shaft 134 is configured to transmit a first portion of the rotational energy generated by the electric motor 106 to the first axle hub 112 for use in rotationally driving the wheel 16 mounted thereon. Similarly, the second axle shaft 136 is positioned between the electric drive system 104 and the second axle hub 114 along the longitudinal direction 120. Specifically, the second axle shaft 136 extends along the longitudinal direction 120 from a first end 144 of the second axle shaft 136 to a second end 146 of the second axle shaft 136. The first end 144 of the second axle shaft 136 is coupled to a second side 148 of the electric drive system 104 and, more specifically, to the electric motor 106 on the second side 148 of the electric drive system 104 via the gearbox 108. Conversely, the second end 146 of the second axle shaft 136 is coupled to the second axle hub 114. In this respect, the second axle shaft 136 is configured to transmit a second portion of the rotational energy generated by the electric motor 106 to the second axle hub 114 for use in rotationally driving the wheel 16 mounted thereon.

In some embodiments, the first and second axle shafts 134, 136 may respectively include first and second flexible members 135, 137. Specifically, the first and second flexible members 135, 137 may be positioned along the lengths of the first and second axle shafts 134, 136, respectively. In this respect, the flexible members 135, 137 may allow the first and second axle hubs 112, 114 to move independently of the first and second axle shafts 134, 136, respectively. As such, the first and second flexible members 135, 137 may correspond to any suitable components that facilitate such movement, such as U-joints or CV joints.

Moreover, as shown in FIG. 4, in some embodiments, the electric drive system 104 is at least partially aligned with the first and second axle shafts 134, 136 in a lateral direction (indicated by arrow 150). More specifically, the axle assembly 100 may generally extend along the lateral direction from a forward end 152 of the axle assembly 100 to an aft end 154 of the axle assembly 100. The lateral direction 150 is, in turn, perpendicular to the longitudinal direction 120 and parallel to the direction of travel 18 of the electric work vehicle 10. As such, the first and second axle shafts 134, 136 are aligned with a portion of the electric drive system 104 in the lateral direction 150.

Referring again to FIGS. 2 and 3, the axle assembly 100 includes first and second gear trains 156, 158. In general, the first gear train 156 is configured to increase the torque of the first portion of the rotational energy transmitted by the first axle shaft 134 to the first axle hub 112. Similarly, the second gear train 158 is configured to increase the torque of the second portion of the rotational energy transmitted by the second axle shaft 136 to the second axle hub 114. Specifically, in several embodiments, the first gear train 156 is coupled between the second end 140 of the first axle shaft 134 and first axle hub 112. Moreover, in several embodiments, the second gear train 158 is coupled between the second end 146 of the second axle shaft 136 and the second axle hub 114. Example configurations of the first and second gear trains 156, 158 will be described below.

As shown, the first and second gear trains 156, 158 are positioned closer to the first and second axle hubs 112, 114 than to the electric drive system 104 along the longitudinal direction 120, respectively. More specifically, as indicated above, the first and second gear trains 156, 158 are positioned outboard of the first and second axles shafts 134, 136 such that the first and second gear trains 156, 158 are closer to the first and second axles hubs 112, 114 than to the electric motor 106, respectively. Thus, the first and second axles shafts 134, 136 transmit the rotational energy generated by the electric motor 106 to the first and second gear trains 156, 158, which increase the torque of the rotational energy to a level suitable for driving the wheels 16 of the electric work vehicle 10. In this respect, the axle assembly 100 allows the rotational energy generated by the electric motor 106 to be transmitted by the first and second axle shafts 134, 136 at a lower torque level than if the first and second gear trains 156, 158 were inboard of the first and second axles 134, 136, respectively. This, in turn, reduces the load placed on the first and second axles shafts 134, 136, which allows for a reduction in the size and cost of the first and second axle shafts 134, 136.

Furthermore, as particularly shown in FIG. 1, in several embodiments, the frame 12 of the electric work vehicle 10 is supported on the first and second axle hubs 112, 114. Moreover, the frame 12 of the electric work vehicle 10 is unsupported on the first and second axle shafts 134, 136. That is, the weight of the frame 12 and the components supported thereon is carried by or otherwise transmitted to the wheels 16 via the first and second axle hubs 112, 114. Thus, the first and second axle shafts 134, 136 do not support the weight of the frame 12 and the components coupled thereto. Supporting the frame 12 on the first and second axle hubs 112, 114 further reduces the load placed on the first and second axles shafts 134, 136. For example, in one embodiment, first and second frame mounts 160, 162 may be coupled to or otherwise mounted on the first and second axle hub spindles 122, 126. However, in alternative embodiments, the frame 12 of the electric work vehicle 10 may be supported on the first and second axle hubs 112, 114 in any suitable manner.

As indicated above, in several embodiments, the axle assembly 102 includes the housing 102. In general, the housing 102 encloses or encapsulates one or more components of the axle assembly 100, such as to protect such component(s) from the environment and/or allow such component(s) to be bathed in a lubricant (e.g., oil). For example, in one embodiment, the electric motor 106, the first axle shaft 134, the first gear train 156, the second axle shaft 136, and the second gear train 158 are positioned within the housing 102. Moreover, the housing 102 may allow the axle assembly 100 to be constructed as an integrated assembly of components for easy installation in the electric work vehicle 10.

In addition, the axle assembly 100 may be configured in any suitable manner based on the construction of the electric work vehicle 10 so long as the first and second gear trains 156, 158 are positioned closer to the first and second axle hubs 112, 114 than to the electric drive system 104 along the longitudinal direction 120, respectively. For example, in one embodiment, the axle assembly 100 may be configured as a normal axle, such as to decrease the center of gravity of the electric work vehicle 10. In another embodiment, the axle assembly 100 may be configured as a portal axle, such as to increase the ground clearance of the electric work vehicle 10. Moreover, in a further embodiment, portions of certain components of the axle assembly 100 (e.g., a component(s) of the electric drive system 104 and/or the first and second gear trains 156, 158) be positioned aft of the first and second axle shafts 134, 136 along the lateral direction 150, such as to provide addition clearance for the battery module 24.

Figure 6:
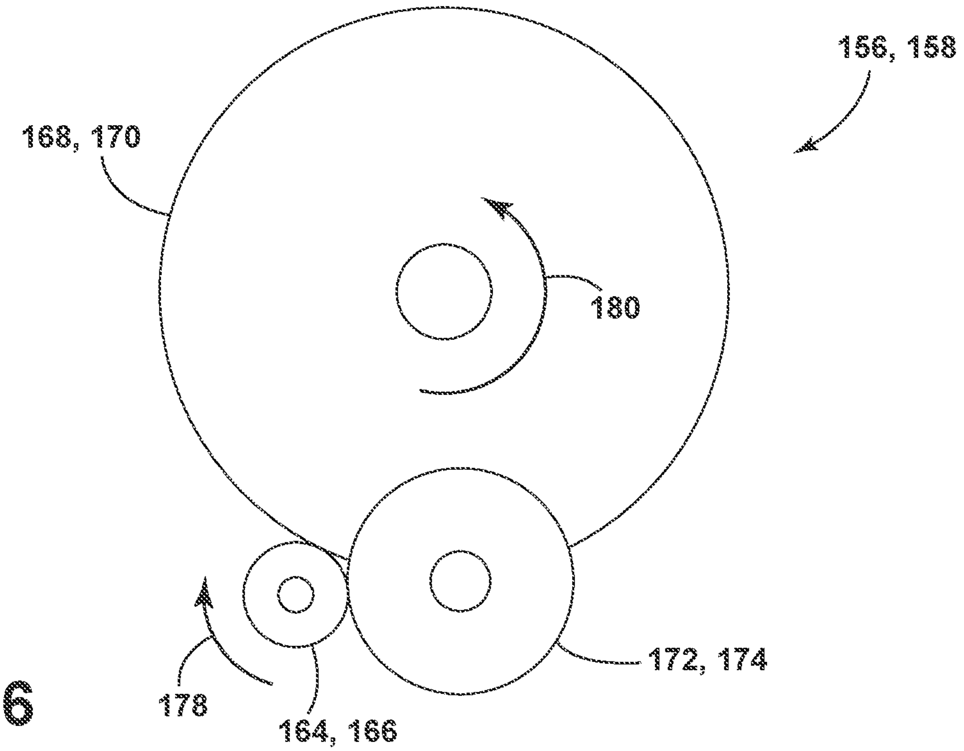
FIG. 6 illustrates a side view of the first and second gear trains shown in FIG. 5.
Figure 7:
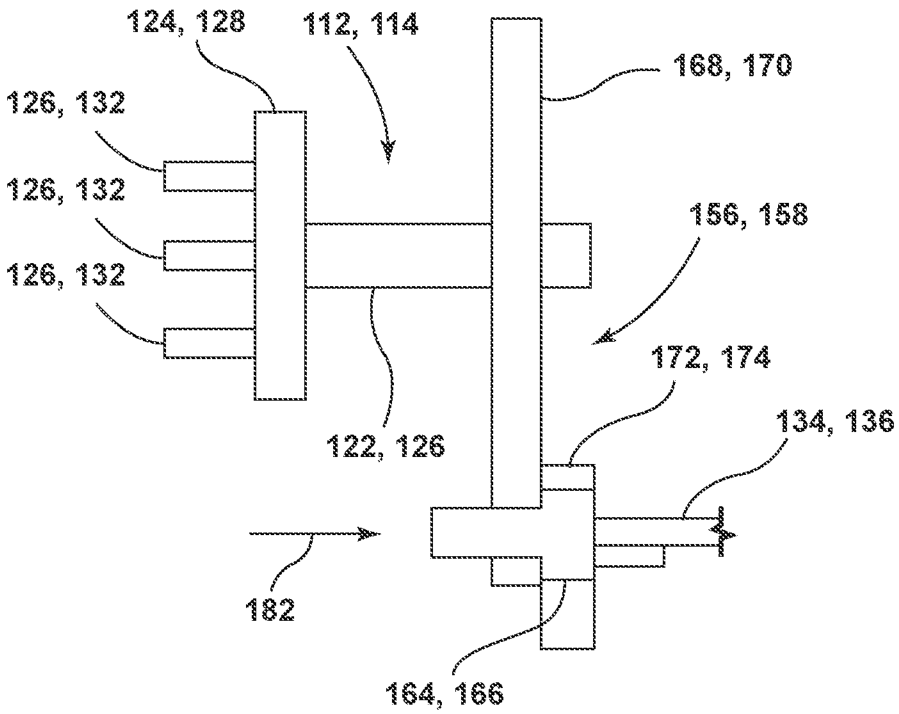
FIG. 7 illustrates another front view of the first and second gear trains shown in FIGS. 5 and 6, particularly illustrating intermediate gears of the first and second gear trains at a second position.
Figure 8:
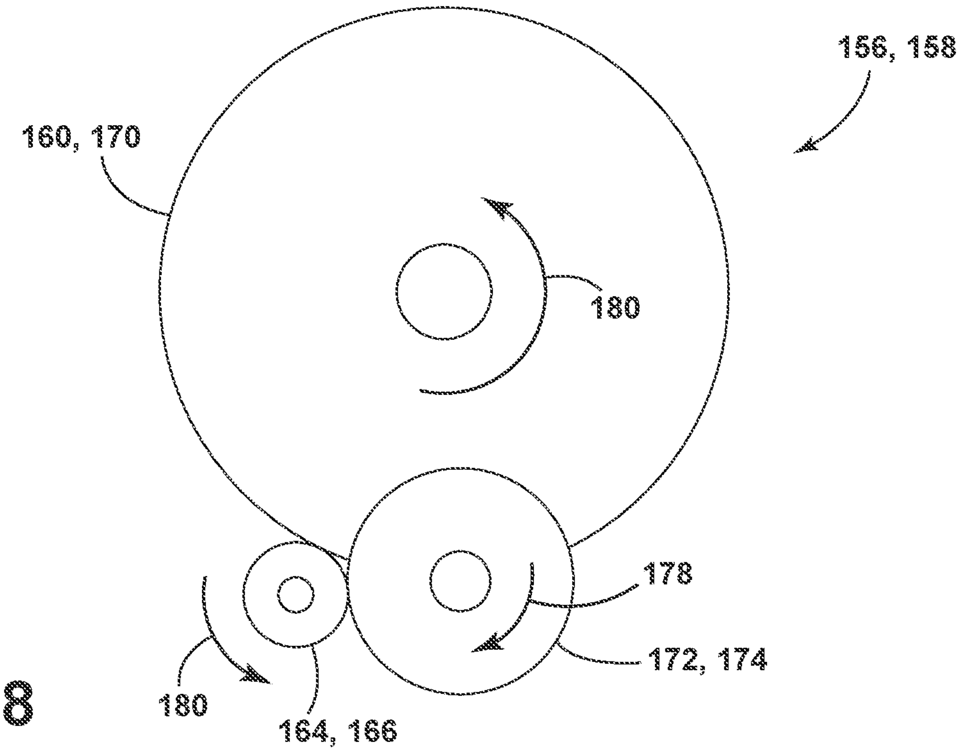
FIG. 8 illustrates a side view of the first and second gear trains shown in FIG. 7.

FIGS. 5-8 illustrate differing views of one embodiment of the first and second gear trains 156, 158. Specifically, FIGS. 5 and 7 illustrate front views of the first and second gear trains 156, 158. Additionally, FIGS. 6 and 8 illustrate side views of the first and second gear trains 156, 158.

As shown, in several embodiments, the first and second gear trains 156, 158 respectively include input gears 164, 166; output gears 168, 170; and intermediate gears 172, 174. More specifically, the input gear 164 of the first gear train 156 is coupled to the second end 140 of the first axle shaft 134 and the input gear 166 of the second gear train 158 is coupled to the second end 146 of the second axle shaft 136. Furthermore, the output gear 168 of the first gear train 156 is coupled to first axle hub 112 (e.g., the first axle hub spindle 122) and the output gear 170 of the second gear train

158 is coupled to the second axle hub 114 (e.g., the second axle hub spindle 126). In addition, the intermediate gear 172 of the first gear train 156 is coupled between the input and output gears 164, 168 of the first gear train 156 and the intermediate gear 174 of the second gear train 158 is coupled between the input and output gears 166, 170 of the second gear train 158.

In some embodiments, the intermediate gears 172, 174 of the first and second gear trains 156, 158 may be movable to provide differing gear ratios. For example, as shown in FIGS. 5 and 6, the intermediate gears 172, 174 of the first and second gear trains 156, 158 may be moved or slid in a first linear direction (indicated by arrow 176) to a first position. When at the first position, the input gears 164, 166 directly engage the corresponding output gears 168, 170 such that, when the input gears 164, 166 rotate in a first rotational direction (indicated by arrow 178), the output gears 168, 170 rotate in an opposite, second rotational direction (indicated by arrow 180). The intermediate gears 172, 174 do not rotate when at the first position. Conversely, as shown in FIGS. 7 and 8, the intermediate gears 172, 174 of the first and second gear trains 156, 158 may be moved or slid in a second linear direction (indicated by arrow 182) to a second position. When at the second position, the input gears 164, 166 directly engage the corresponding intermediate gears 172, 174 and the intermediate gears 172, 174 directly engage the corresponding output gears 168, 170 such that, when the input gears 164, 166 rotate in the second rotational direction (indicated by arrow 180), the intermediate gears 172, 174 rotate in the first rotational direction 178 and the output gears 168, 170 rotate in the second rotational direction. Such sliding of the intermediate gears 172, 174 from the first position to the second position necessitates a reverse in the direction of the electric motor 106 (FIGS. 2 and 3). Thus, the first and second gear trains 156, 158 provide a first gear ratio (e.g., a relatively higher gear ratio) when the intermediate gears 172, 174 are at the first position (FIGS. 5 and 6) and a second gear ratio (e.g., a relatively lower gear ratio) when the intermediate gears 172, 174 are at the second position (FIGS. 7 and 8).

Figure 9:
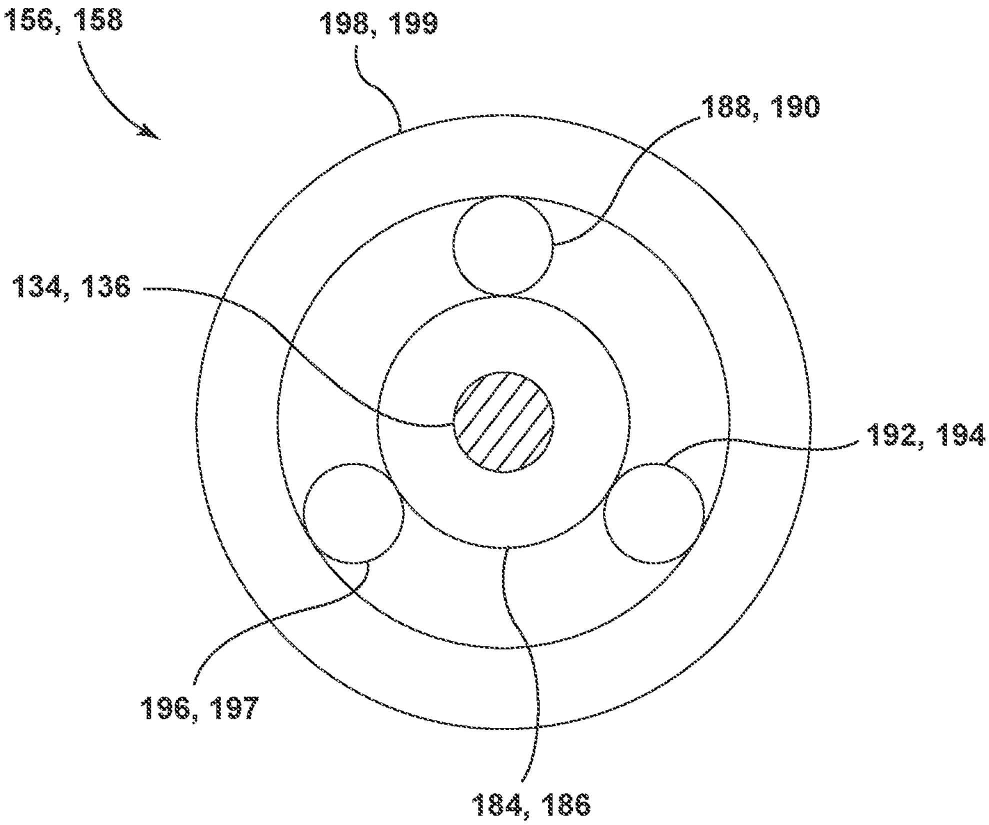
FIG. 9 illustrates a side view of another embodiment of first and second gear trains of an axle assembly for an electric work vehicle in accordance with aspects of the present subject matter.

FIG. 9 illustrates a side view of another embodiment of first and second gear trains 156, 158. Specifically, as shown in the illustrated embodiment, the side view of another embodiment of first and second gear trains 156, 158 are configured as first and second planetary gear sets. In such an embodiment, the first gear train 156 includes a sun gear 184 coupled to the first axle shaft 134 and the second gear train 158 includes a sun gear 186 coupled to the second axle shaft 136. Furthermore, the first gear train 156 includes planet gears 188, 192, 196 that engage the sun gear 184 and the second gear train 158 includes planet gears 190, 194, 197 that engage the sun gear 188. Additionally, the first gear train 156 includes a ring gear 198 that engages the planet gears 188, 192, 196 and is coupled to the first axle hub 112 and the second gear train 158 includes a ring gear 199 that engages the planet gears 190, 194, 197 and is coupled to the second axle hub 114.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An axle assembly for an electric work vehicle, the axle assembly comprising:

an electric drive system including an electric motor configured to generate rotational energy;

a first axle hub configured to be rotationally driven by the electric motor;

a first axle shaft including a first end and a second end, the first end of the first axle shaft coupled to the electric motor such that the first axle shaft transmits a first portion of the rotational energy generated by the electric motor to the first axle hub;

a first gear train coupled between the second end of the first axle shaft and the first axle hub, the first gear train configured to increase a torque of the first portion of the rotational energy transmitted by the first axle shaft to the first axle hub;

a second axle hub configured to be rotationally driven by the electric motor;

a second axle shaft including a first end and a second end, the first end of the second axle shaft coupled to the electric motor such that the second axle shaft transmits a second portion of the rotational energy generated by the electric motor to second axle hub; and a second gear train coupled between the second end of the second axle shaft and the second axle hub, the second gear train configured to increase a torque of the second portion of the rotational energy transmitted by the second axle shaft to the second axle hub, wherein the first gear train comprises an input gear coupled to the first axle shaft, an output gear coupled to the first axle hub, and an intermediate gear, and wherein the second gear train comprises an input gear coupled to the second axle shaft, an output gear coupled to the second axle hub, and an intermediate gear.

2. The axle assembly of claim 1, wherein a frame of the electric work vehicle is supported on the first and second axle hubs.

3. The axle assembly of claim 2, wherein the frame of the electric work vehicle is unsupported on the first and second axle shafts.

4. The axle assembly of claim 1, wherein:

the axle assembly extends along a longitudinal direction from the first axle hub to the second axle hub; and the first and second gear trains are positioned closer to the first and second axle hubs than to the electric drive system along the longitudinal direction, respectively.

5. The axle assembly of claim 4, wherein the first end of the first axle shaft is coupled to a first side of the electric drive system and the first end of the second axle shaft is coupled to a second side of the electric drive system.

6. The axle assembly of claim 4, wherein:

the axle assembly extends along a lateral direction from a forward end of the axle assembly to an aft end of the axle assembly; and the electric drive system is at least partially aligned with the first and second axle shafts in the lateral direction.

7. The axle assembly of claim 1, wherein the electric drive system further includes a gearbox and an inverter.

8. The axle assembly of claim 1, further comprising:

a housing in which the electric motor, the first axle shaft, the first gear train, the second axle shaft, and the second gear train are positioned.

9. The axle assembly of claim 1, wherein:

the intermediate gear of the first gear train is slidable between a first position at which the input gear of the first gear train directly engages the output gear of the first gear train and a second position at which the input gear of the first gear train directly engages the intermediate gear of the first gear train and the intermediate gear of the first gear train directly engages the output gear of the first gear train; and the intermediate gear of the second gear train is slidable between a first position at which the input gear of the second gear train directly engages the output gear of the second gear train and a second position at which the input gear of the second gear train directly engages the intermediate gear of the second gear train and the intermediate gear of the second gear train directly engages the output gear of the second gear train.

10. The axle assembly of claim 9, wherein the first gear train comprises a first planetary gear set and the second gear train comprises a second planetary gear set.

11. The axle assembly of claim 1, wherein the first axle shaft comprises a first flexible member and the second axle shaft comprises a second flexible member.

12. An electric work vehicle, comprising:

a frame; and an axle assembly coupled to the frame, the axle assembly comprising:

an electric drive system including an electric motor configured to generate rotational energy;

a first axle hub configured to be rotationally driven by the electric motor;

a first axle shaft including a first end and a second end, the first end of the first axle shaft coupled to the electric motor such that the first axle shaft transmits a first portion of the rotational energy generated by the electric motor to the first axle hub;

a first gear train coupled between the second end of the first axle shaft and the first axle hub, the first gear train configured to increase a torque of the first portion of the rotational energy transmitted by the first axle shaft to the first axle hub;

a second axle hub configured to be rotationally driven by the electric motor;

a second axle shaft including a first end and a second end, the first end of the second axle shaft coupled to the electric motor such that the second axle shaft transmits a second portion of the rotational energy generated by the electric motor to second axle hub; and a second gear train coupled between the second end of the second axle shaft and the second axle hub, the second gear train configured to increase a torque of the second portion of the rotational energy transmitted by the second axle shaft to the second axle hub, wherein the frame is supported on the first and second axle hubs, wherein the first gear train comprises a first input gear coupled to the first axle shaft, a first output gear coupled to the first axle hub, and a first intermediate gear, and wherein the second gear train comprises a second input gear coupled to the second axle shaft, a second output gear coupled to the second axle hub, and a second intermediate gear.

13. The electric work vehicle of claim 12, wherein the frame is unsupported on the first and second axle shafts.

14. The electric work vehicle of claim 12, wherein:

the axle assembly extends along a longitudinal direction from the first axle hub to the second axle hub; and the first and second gear trains are positioned closer to the first and second axle hubs than to the electric drive system along the longitudinal direction, respectively.

15. The electric work vehicle of claim 14, wherein the first end of the first axle shaft is coupled to a first side of the electric drive system and the first end of the second axle shaft is coupled to a second side of the electric drive system.

16. The electric work vehicle of claim 12, wherein the electric drive system further includes a gearbox and an inverter.

17. The electric work vehicle of claim 12, further comprising:

a housing in which the electric motor, the first axle shaft, the first gear train, the second axle shaft, and the second gear train are positioned.

18. The electric work vehicle of claim 12, wherein:

the first intermediate gear is slidable between a first position at which the first input gear directly engages the first output gear and a second position at which the first input gear directly engages the first intermediate gear and the first intermediate gear directly engages the first output gear; and the second intermediate gear is slidable between a first position at which the second input gear directly engages the second output gear and a second position at which the second input gear directly engages the second intermediate gear and the second intermediate gear directly engages the second output gear.

* * * * *